United States Patent [19]

Barclay et al.

[11] Patent Number: 4,746,503

[45] Date of Patent: May 24, 1988

[54] METHOD OF TREATING ALUMINA TO INCREASE SLURRY LIFE

[75] Inventors: David A. Barclay, Ponca City, Okla.; Daniel T. Plummer, Houston, Tex.

[73] Assignee: Vista Chemical Company, Houston, Tex.

[21] Appl. No.: 917,661

[22] Filed: Oct. 9, 1986

[51] Int. Cl.[4] .............................................. C01F 7/02
[52] U.S. Cl. .................................. 423/630; 423/129; 423/625; 423/626; 423/627; 75/68 A
[58] Field of Search .............. 423/625, 626, 627, 630, 423/129; 75/68 A

[56] References Cited

U.S. PATENT DOCUMENTS

| | | | |
|---|---|---|---|
| 3,839,536 | 10/1974 | Shozo Sato et al. | 423/630 |
| 4,191,737 | 3/1980 | Irvine | 423/625 |
| 4,492,682 | 1/1985 | Trebillon | 423/626 |

FOREIGN PATENT DOCUMENTS 904411  8/1962  United Kingdom ............... 423/630

*Primary Examiner*—Patrick P. Garvin
*Assistant Examiner*—Paige C. Harvey
*Attorney, Agent, or Firm*—Browning, Bushman, Zamecki & Anderson

[57] ABSTRACT

A process for treating dry, particulate alumina for use in preparing alumina slurries which are resistant to gellation in which the particulate alumina is contacted with a carbon dioxide rich gaseous medium for a suitable time.

12 Claims, No Drawings

METHOD OF TREATING ALUMINA TO INCREASE SLURRY LIFE

BACKGROUND OF THE INVENTION

1. Field of the Invention

The present invention relates to a method for treating alumina and, more particularly, to a method of providing an alumina having increase slurry life.

2. Description of the Background

Alumina in slurry form is used in a wide variety of applications. Alumina slurries are used in frictionizing paper surfaces, fiberglass surfaces and metal surfaces, as anti-static and soil protection on wool, nylon and acrylic carpets, as a dispersion agent in rug shampoos, as anti-static and anti-soil agents, as binders for vacuum cast alumina silica fibers, as a sintering aid, and for coating ceramic monoliths for auto exhaust catalysts. The aluminas commonly used in such applications are the aluminum oxyhydroxide, particularly the alpha alumina monohydrates. To form such alumina slurries, the alumina is placed into a dispersion or suspension using a peptizing agent such as an acid as, for example, hydrochloric acid, nitric acid, etc. Alumina slurries, unless stabilized in some manner, tend to viscosify rapidly, forming thick gelatinous materials (gels), thereby making them difficult to use in the commercial applications described above. Accordingly, it becomes important to maintain a prepared alumina slurry at a desired, low viscosity for as long as possible.

It is known from U.S. Pat. No. 4,191,737 that alumina slurries can be stabilized by treatment with hot water and bubbling carbon dioxide through the alumina slurry. Similarly, British Pat. No. 904,411 teaches the stabilization of alumina slurries by bubbling a carbon dioxide medium therethrough.

It is also known, as taught by Feldkamp, et al, *J. Pharmaceutical Sci.* 70, pp. 638-640 (1981) and Scholtz et al, *J. Pharmaceutical Sci.* 74 (4), p. 478 (1985) that carbonate formed on the surface of alumina will alter the rheology and gellation rate of alumina/water dispersions.

SUMMARY OF THE INVENTION

It is therefore an object of the present invention to provide a process for treating alumina for use in forming slurries or dispersions.

Another object of the present invention is to provide a method of treating an alumina which exhibits inhibited gellation characteristics in slurries and dispersions.

Still another object of the present invention is to provide an alumina slurry or dispersion exhibiting inhibited gellation and having an increased low viscosity lifetime.

The above and other objects of the present invention will become apparent from the description given herein and the appended claims.

In one embodiment, the present invention provides a method of treating alumina for use in forming dispersions of alumina which exhibit inhibited gellation comprising providing a dry, particulate alumina and contacting the particulate alumina with a gaseous carbon dioxide medium such as pure carbon dioxide, carbon dioxide/air mixtures, carbon dioxide/nitrogen mixtures, etc.

In yet another embodiment of the present invention, there is provided a method for forming a dispersion of alumina comprising treating particulate alumina as described above followed by dispersing the treated alumina in an aqueous medium containing a peptizing agent.

DESCRIPTION OF THE PREFERRED EMBODIMENT

The present invention is applicable to any of the various forms of aluminum oxyhydroxides. Thus, while any form of alumina can be used, the present invention is particularly directed to the treatment of boehmite, pseudoboehmite or amorphous precursors.

In the process of the present invention, a dry, particulate alumina is treated with a gaseous carbon dioxide medium either by passing the carbon dioxide medium into contact with the particulate alumina in a dynamic treatment step or, alternately, allowing the particulate alumina to remain in a generally quiescent carbon dioxide rich atmosphere.

The term "particulate" is intended to include any of the various powder or particle forms of alumina. The particle size of the alumina treated in accordance with the present invention is generally not critical. It will be appreciated that the smaller the particle size, the greater the surface area with the result that the treated alumina may have a prolonged low viscosity lifetime, i.e. retard gellation, better than a particulate alumina of a larger particle size. However, it must be emphasized that a smaller particle size does not necessarily carry with it the advantage that the treated alumina will exhibit a longer, low viscosity lifetime. As a general rule, the particle size of the alumina treated in accordance with the present invention will range from about 0.5 microns to about 500 microns.

The gaseous carbon dioxide medium used to treat the alumina can be either in the form of substantially pure carbon dioxide, or can be a mixture of carbon dioxide with other gases such as, for example, carbon dioxide/air mixture, carbon dioxide/nitrogen mixtures, etc. The gaseous carbon dioxide medium need only be a carbon dioxide "rich" atmosphere, i.e. the carbon dioxide content of the gaseous medium should be about 5% or greater by volume. However, since for a given period of treatment the rheology properties (low viscosity) of the treated alumina dispersions are more pronounced, it is desirable to use a substantially pure carbon dioxide medium.

The treatment of the alumina in accordance with the present invention can be carried out at virtually any temperature. Generally, the treatment is carried out at ambient temperature, although temperatures of up to 150° F. and higher can be employed. The temperature should not exceed the dehydration temperature of the alumina.

The rate of gellation and the rheology of alumina dispersions prepared from alumina treated in accordance with the present invention can be controlled by controlling the treatment period or, as noted above, the content of $CO_2$ in the gaseous medium. Generally speaking, as the treatment time of the alumina increases, the rate of gellation of the alumina dispersions made with the treated alumina decreases, i.e. the dispersions exhibit a low viscosity life span directly related to the treatment time of the alumina with the carbon dioxide. The treatment time need only be long enough to impart to the alumina a reduced tendency to gel or viscosify in a peptizing, e.g., aqueous acid, medium. Generally speaking, the treatment time of the alumina with the carbon dioxide medium will range from about one-half hour to about 240 hours, depending on the CO₂ content of the gaseous medium. Usually, treatment times ranging from about 10 hours to about 60 hours are sufficient to render the alumina suitable for preparing inhibited gellation dispersions.

The treatment of the alumina, as noted above, can be carried out under dynamic conditions wherein the particulate alumina is contacted with a flowing stream of the gaseous carbon dioxide medium. Thus, for example, the particulate alumina can be treated in a gas/solid fluidized bed system. Alternately, the treatment can be carried out by exposing the particulate alumina to a carbon dioxide rich atmosphere in a generally quiescent state. In such a process, the particulate alumina is introduced into a suitable vessel following which the carbon dioxide medium is introduced into the vessel after which the vessel is essentially sealed until the treatment time has elapsed.

To prepare slurries or dispersions of alumina in accordance with the present invention, the alumina, treated with carbon dioxide as discussed above, is dispersed in an aqueous medium containing a peptizing agent. Suitable peptizing agents include monovalent acids such as nitric acid, hydrochloric acid, formic acid, acetic acid, etc. Other peptizing agents include metal salts of monovalent acids such as aluminum nitrate, aluminum chloride, ferric nitric, ferric chloride, ferric nitrate, tin (II) chloride, etc.

To illustrate the invention, the following non-limiting examples are presented. Data and results for the examples are summarized in Table I.

EXAMPLE 1

A quantity of a boehmite alumina marketed under the trademark Catapal B by Vista Chemical Company was charged to a desicator. Carbon dioxide was introduced through a tube into the desicator for about five minutes after which the desicator was sealed and left for 24 hours. At the end of the time, the alumina was tested for nitric acid gellation (NAG). The NAG time is defined as the time it takes a solution of the alumina to reach 5,000 CPS following the addition of the nitric acid. The alumina treated as above was found to have a NAG time of 30+ minutes, whereas the same alumina, untreated, had a NAG time of 6.1 minutes.

EXAMPLE 2

The procedure of Example 1 was repeated using Catapal A alumina, Catapal B alumina and Catapal D alumina. The time spent in the carbon dioxide rich atmosphere was 68 hours. As can be seen in Table I, the PI times of the Catapal A and D aluminas each increased about ten minutes. The PI (Peptization Index) time is defined as the time it takes a solution of the alumina to reach 5,000 CPS following the addition of formic acid. The acid dispersability of the samples was essentially unchanged. As can also be seen, in the case of the Catapal B and D, the NAG values of the treated alumina was markedly increased over that of the untreated aluminas.

EXAMPLE 3

The procedure in Examples 1 and 2 was followed with the following exception: a tee was attached to the inlet on the desicator. The CO₂ source was then attached to one side of the tee and a U-tube with water attached to the remaining leg. CO₂ flow was adjusted to maintain a slight positive pressure on the desicator. A quantity of Catapal D alumina was charged to the desicator and left for 52.5 hours in the flowing CO₂ atmosphere. As seen in Table I, the NAG increased to 57 minutes from less than 1 minute while acid dispersability was not affected.

EXAMPLE 4

The procedure of Example 3 was followed except that a Catapal A alumina was charged to the apparatus and left 47 hours. As can be seen from Table I, the PI time increased to 33 minutes over the untreated alumina.

EXAMPLE 5

The procedure of Example 3 was followed using a Catapal D alumina. The Catapal was left in the desicator for 50 hours. As seen in Table I, the NAG increased to 30+ minutes from less than a minute for the untreated alumina.

A portion of the alumina treated as per this Example was sealed in a desicator along with a quantity of sodium hydroxide pellets. After 142 hours, the NAG was measured and was found to have returned to the original time of less than one minute (See Table I).

It can thus be seen that by controlling the exposure time and the carbon dioxide available, it is possible to alter the rate of gellation and control the rheology of the alumina dispersions. At the same time, the acid dispersability is unaffected by the CO₂ treatment and, as can be seen from this Example, it appears to be possible to reverse the process of CO₂ adsorption by the alumina.

TABLE I

| | | | TIME | BEFORE TREATMENT | | | | AFTER TREATMENT | | | |
|---|---|---|---|---|---|---|---|---|---|---|---|
| EXAMPLE | CATAPAL | ATMOSPHERE | (HOURS) | NAG | PI | Al₂O₃ | % DISP | NAG | PI | Al₂O₃ | % DISP |
| 1 | B | CO₂ | 24 | 6.1 | 28.2 | 70.51 | | 30+ | | 70.9 | |
| 2 | A | CO₂ | 68 | 30+ | 17.8 | 70.74 | 79.3 | 30+ | 28 | | 65.18 |
| | B | CO₂ | 68 | 5.3 | 28.2 | 70.51 | 87.5 | 30+ | 38 | | 89.15 |
| | D | CO₂ | 68 | <1 | 60+ | | 96.4 | 30+ | 60+ | | 96.45 |
| 3 | D | CO₂ Flow | 52.5 | <1 | 60+ | | 96.4 | 57 | 60+ | | 96.28 |
| 4 | A | CO₂ Flow | 47 | 30+ | 17.8 | 70.74 | 79.3 | 30+ | 33 | | 66.9 |
| 5 | D | CO₂ Flow | 50 | <1 | 60+ | | 96.4 | 30+ | | | |
| | D | Air + NaOH | 142 | 30+ | | | | <1 | | | |

EXAMPLE 6

This Example illustrates the application of the treated alumina to forming dispersions having reduced tendency to gellation. A dispersion of CO₂ treated Catapal D alumina containing 15.8% Al₂O₃ was prepared from 22.0 grams of the treated alumina, 1.1 grams of 37.5% HCL (equivalent to 0.73 meq H+/g Al₂O₃) and 76.9 grams H₂O. A portion of the dispersion was left at room temperature (Sample 1) and another portion was aged at a temperature of 95° C. for approximately two weeks, then removed to room temperature (Sample 2). During this time frame, neither sample gelled or became highly viscous. By comparison, a pair of dispersions prepared as above from untreated Catapal D alumina (Samples 3 and 4) became very viscous, both at room temperature and at 95° C. Viscosity measurements were made on all four dispersions seven weeks after their preparation. The results, in Table II, demonstrate that the $CO_2$-treated Catapal D alumina-derived dispersions are much less viscous than the corresponding dispersions of untreated Catapal alumina. All but Sample 2 (a mobile liquid) exhibited a gel structure which was destroyed by shaking the sample for ten seconds prior to viscosity measurement.

TABLE II

| Sample Number | Alumina | Aging Temperature | Viscosity, cP |
|---|---|---|---|
| 1 | $CO_2$-treated | Room Temperature | 1,400 |
| 2 | $Co_2$-treated | 95° C.* | <20 |
| 3 | Untreated | Room Temperature | 25,000 |
| 4 | Untreated | 95° C.* | 800 |

*Aging time approximately two weeks.

As can be seen from the foregoing examples, the present invention provides an easy and effective method to treat dry, particulate alumina for use in forming dispersions which exhibit inhibited gellation and in which the low viscosity lifetime is increased. The method of the present invention avoids the obvious problems associated with the prior art processs of treating alumina slurries with carbon dioxide. The process of the present invention does not result in any loss of acid dispersability of the alumina and can be reversed by subjecting the treated alumina to a desorption process.

The foregoing disclosure and description of the invention is illustrative and explanatory thereof, and various changes in the method steps may be made within the scope of the appended claims without departing from the spirit of the invention.

What is claimed is:

1. A method of treating alumina for use in forming dispersions of said alumina exhibiting inhibited gellation, comprising:
   providing a dry, particulate, alumina; and
   contacting said particulate alumina with a gaseous carbon dioxide medium.

2. The method of claim 1 wherein said alumina comprises boehmite.

3. The method of claim 1 wherein said gaseous carbon dioxide medium comprises substantially pure carbon dioxide.

4. The method of claim 1 wherein said gaseous carbon dioxide medium comprises a mixture of air and carbon dioxide.

5. The method of claim 1 wherein said contacting is carried out for a period of from about one-half to about 240 hours.

6. The method of claim 1 wherein said contacting is carried out by flowing said gaseous carbon dioxide medium into contact with said particulate alumina.

7. A method of forming an alumina dispersion comprising:
   providing a dry, particulate alumina;
   contacting said particulate alumina with a gaseous carbon dioxide medium;
   dispersing the treated alumina in an aqueous peptizing medium.

8. The method of claim 7 wherein said alumina comprises boehmite.

9. The method of claim 7 wherein said gaseous carbon dioxide medium comprises substantially pure carbon dioxide.

10. The method of claim 7 wherein said gaseous carbon dioxide medium comprises a mixture of air and carbon dioxide.

11. The method of claim 7 wherein said contacting is carried out for a period of about one-half to about 240 hours.

12. The method of claim 7 wherein said peptizing agent comprises an acid.

* * * * *